Feb. 4, 1947.         C. W. JOHNSON         2,415,137
CHAIN SAW FILING RACK
Filed Nov. 16, 1945
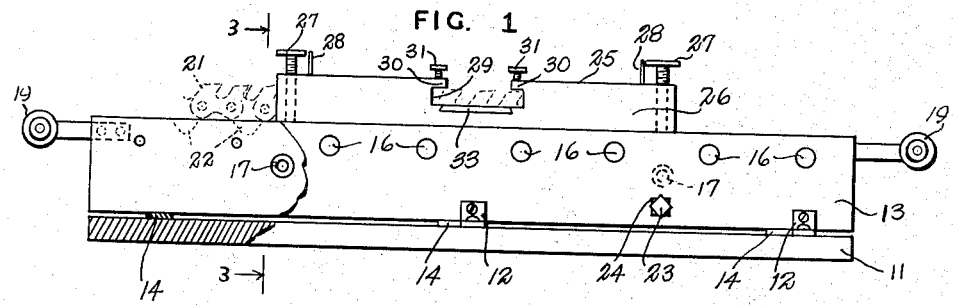
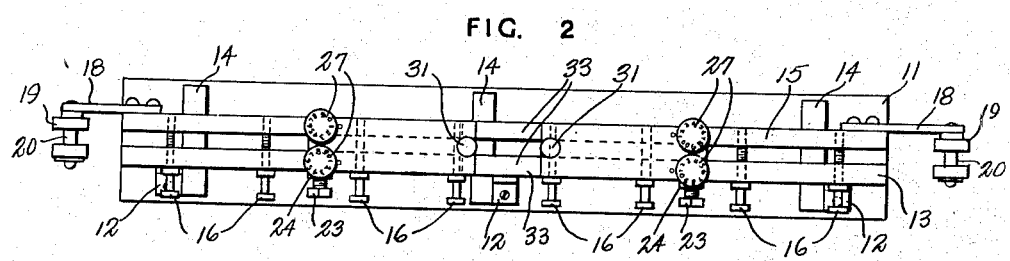
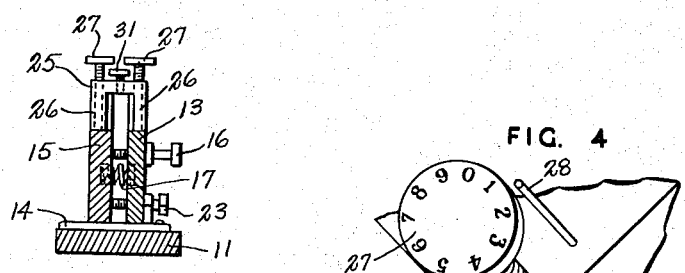
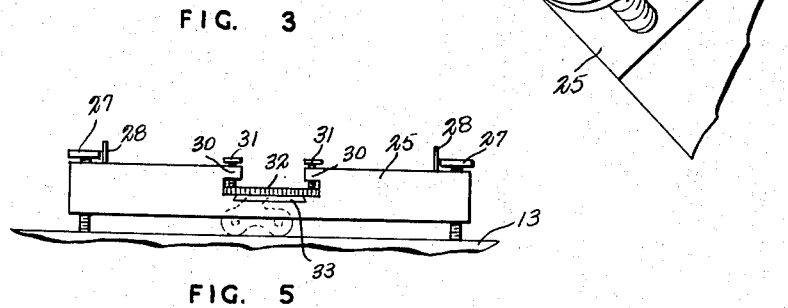
INVENTOR
CARL W. JOHNSON,
BY
ATTORNEYS Patented Feb. 4, 1947

2,415,137

UNITED STATES PATENT OFFICE 2,415,137

CHAIN SAW FILING RACK

Carl W. Johnson, Kent, Wash.

Application November 16, 1945, Serial No. 629,134

3 Claims. (Cl. 76—47)

The invention relates to devices for sharpening saws, and more particularly to means for supporting and gauging chain saws during the process of sharpening the saws.

A main object of the invention is to provide novel and improved means for positioning and supporting chain saws during the process of sharpening, said means being very simple in structure, easy to use, and greatly increasing the accuracy of the sharpening operation.

A further object of the invention is to provide an improved clamp device for rigidly securing chain saws in position for sharpening, said clamp device consisting of a few very simple parts and being very easy to manufacture and use.

A still further object of the invention is to provide a gauge device adapted to accurately prepare a chain saw for sharpening, said gauge device being employed in conjunction with clamping means for securing the chain saw in proper position for sharpening.

Further objects and advantages of the invention will appear from the following description and claims, and from the accompanying drawing, wherein:

Figure 1 is a side elevational view of a chain saw clamping means and gauge device constructed in accordance with this invention.

Figure 2 is a top plan view of the structure of Figure 1.

Figure 3 is a cross-sectional view taken on line 3—3 of Figure 1.

Figure 4 is a detail perspective view of a calibrated adjusting screw and pointer means therefor employed in the gauge device of Figure 1.

Figure 5 is a side elevational view of the gauge device of Figure 1 shown in preliminary position on the clamping means for performing the initial step of the chain saw sharpening operation.

Referring to the drawing, 11 designates a generally elongated rectangular base member for the clamp device. Rigidly secured to base member 11 by angle brackets 12 is a vertical plate member 13 extending longitudinally of the base member 11 and supported in spaced relation with respect thereto by a plurality of transverse bar members 14 rigidly secured to base member 11.

Slidably mounted on transverse bar members 14 is a transversely movable vertical plate member 15 extending parallel to stationary plate member 13 and adjustably secured to said stationary plate member 13 by a plurality of collared bolt members 16, said bolt members 16 being threadedly engaged with movable plate member 15 so as to draw plate member 15 toward stationary plate member 13 when said bolt members are tightened. A pair of coil springs 17 are positioned between plate members 13 and 15 to bias plate member 15 outwardly with respect to plate member 13.

Extending from each end of movable plate member 15 is a bracket bar 18, each bracket bar 18 having pivotally secured thereto a guide roller 19 formed with a central annular recess 20 aligned with the longitudinal space between plate members 13 and 15. The roller top surfaces are substantially in the same horizontal plane as the top surfaces of plate members 13 and 15.

The arrangement of plate members 13 and 15 allows a length of chain saw, as shown in dotted view at 21, to be positioned on the top surfaces of plate members 13 and 15 and on rollers 19 with the saw teeth directed upwardly and the depending lug portions 22 of the chain links received between plate members 13 and 15 and in recesses 20 of the rollers 19. By tightening bolt members 16 the chain saw may be securely clamped in this position.

Collared bolt members 16 are located in a horizontal plane adjacent the top plane of plate members 13 and 15. The plate members 13 and 15 are adjustably spaced apart at their lower portions by a pair of bolt members 23 threaded through member 13 and abutting member 15, said bolt members being provided with adjustable lock nuts 24.

Adapted to cooperate with the clamping device is a gauge device 25 comprising a channel member having depending legs 26, 26 whose lower edges are adapted to slide on the top surfaces of plate members 13 and 15. Threaded through each corner portion of gauge device 25 is a screw member 27 having a calibrated face. A vertical pointer element 28 is provided on gauge device 25 adjacent each calibrated screw face so that the bottom end of each screw member 27 may be projected a predetermined distance below the bottom surface of the channel member to thereby raise said channel member said predetermined distance with respect to the top surfaces of plate members 13 and 15.

Gauge device 25 is formed at its central portion with a transverse rectangular recess 29 having overhanging lug portions 30 through which are threaded set screws 31. Recess 29 is adapted to receive a length of file 32 which may be firmly secured in position by set screws 31, as shown in Figure 5. Set into the bottom portions of recess 29 and extending longitudinally thereof are abrasion-resistant hardened steel strips 33.

In operation, gauge device 25 is first set as shown in Figure 5, with screw members 27 tightened substantially all the way so that the gauge device is raised to its maximum level with respect to the clamping device. The chain saw has been previously inserted between the clamping plates with the excess chain hanging down over the rollers 19, the bases of the saw teeth being in contact with the top surfaces of plate members 13 and 15 and securely clamped in position. A flat piece of file 32 is secured in gauge device 25 by set screws 31. With gauge device 25 straddling the saw, screws 27 are adjusted so that the file 32 is level and resting lightly on top of the saw. The gauge device is then slid the full length of the clamping device. This preliminary process is known as "jointing" and levels the saw teeth, leaving a small flat area on the point of each tooth. The jointing process is repeated until all saw teeth of the full length of chain are the same height. File 32 is then removed and screws 27 are loosened until the gauge device is about twelve-thousandths of an inch lower than it was for jointing. The gauge device is moved until one of the inside cutters is centered in recess 29. By operating a file with a back and forth stroke the height of the tooth is lowered by the correct amount. This step is repeated for all the inside cutters, making all said inside cutters the same height. The gauge device is then lowered by another twelve-thousandths of an inch and the leveling process is repeated for the drag teeth. Following this step gauge device 25 is removed and the saw teeth are filed to a point with the same level as was originally present when the saw was received from the manufacturer.

While a specific embodiment of a chain saw sharpening means has been disclosed in the foregoing description, it will be understood that various modifications within the spirit of the invention may occur to those skilled in the art. Therefore it is intended that no limitations be placed on the invention other than as defined by the scope of the appended claims.

What is claimed is:

1. In a chain saw jointer and filer, a base, a bar stationary on said base, a complementary bar movable on said base parallel to and spaced from said stationary bar, means resiliently urging the movable bar away from the stationary bar, means adjacent the lower edges of the bars adjusting the movable bar in relation to the stationary bar, means adjacent the upper edges of the bars drawing the movable bar toward the stationary bar for clamping relation of objects between the bars, rollers positioned at the ends of the bars to facilitate travel of the saw therethrough, a file-holding slider adapted to straddle a chain saw clamped between said bars for contact of the file with upper surfaces of the teeth of the saw for jointing, means adjusting the elevation of the file in relation to the bars, and means mounting files in said slider for engagement with side surfaces of the teeth of the saw for filing.

2. In a jointer and filer for chain saws and the like, a base, a bar stationary on said base, a complementary bar movable on said base parallel to and spaced from said stationary bar, means resiliently urging the movable bar away from the stationary bar, means adjusting the movable bar in relation to the stationary bar, means adjusting the movable bar for clamping relation of objects between the bars, a file-holding slider providing a gauge adapted to straddle a chain saw clamped between said bars for contact of the file with upper surfaces of the teeth of the saw for jointing, said slider having a transverse opening therethrough adapted to expose teeth of the saw for filing, means adjusting the elevation of the file in relation to the bars, and means in said slider for filing side surfaces of the teeth of the saw.

3. In a saw jointer and filer for chain saws and the like, the combination which comprises a base, a stationary bar on said base, a movable complementary bar parallel to said stationary bar and spaced therefrom, resilient means urging the movable bar from the stationary bar, means adjusting the movable bar in relation to the stationary bar, means holding the movable bar for clamping relation of objects between the bars, rollers positioned at the ends of the bars aligned with the space between the bars to facilitate travel of a saw therethrough, a file-holding slider providing a gauge adapted to straddle a saw clamped between said bars, means adjusting the elevation of the file in relation to the upper edges of the teeth of the saw, means mounting files in said slider for engagement with side surfaces of the teeth of the saw for filing, and means adjusting the angle of said files to the cutting angle of the saw teeth.

CARL W. JOHNSON.

REFERENCES CITED

The following references are of record in the file of this patent:

UNITED STATES PATENTS

| Number | Name | Date |
|---|---|---|
| 2,339,509 | Olson | Jan. 18, 1944 |
| 1,861,508 | Newman | June 7, 1932 |
| 2,392,563 | Wilson | Jan. 8, 1946 |
| 2,217,145 | Stihl | Oct. 8, 1940 |